United States Patent
Hornung et al.

(10) Patent No.: US 11,146,591 B2
(45) Date of Patent: Oct. 12, 2021

(54) SECURITY UNIT AND METHOD FOR AN INDUSTRIAL CONTROL SYSTEM

(71) Applicant: CODESYS Holding GmbH, Kempten (DE)

(72) Inventors: Armin Hornung, Wiggensbach (DE); Samuel Greising, Rettenberg (DE); Matthias Maier, Wolfertschwenden (DE); Adrian Scholl, Immenstadt im Allgaeu (DE)

(73) Assignee: CODESYS HOLDING GMBH, Kempten (DE)

( * ) Notice: Subject to any disclaimer, the term of this patent is extended or adjusted under 35 U.S.C. 154(b) by 22 days.

(21) Appl. No.: 16/134,486

(22) Filed: Sep. 18, 2018

(65) Prior Publication Data

US 2019/0089744 A1  Mar. 21, 2019

(30) Foreign Application Priority Data

Sep. 19, 2017  (EP) .................................... 17191881

(51) Int. Cl.
*H04L 29/06* (2006.01)
*G05B 19/418* (2006.01)
(Continued)

(52) U.S. Cl.
CPC .............. *H04L 63/20* (2013.01); *G05B 13/02* (2013.01); *G05B 19/0428* (2013.01);
(Continued)

(58) Field of Classification Search
CPC ....................................................... H04L 63/20
See application file for complete search history.

(56) References Cited

U.S. PATENT DOCUMENTS

2004/0225883 A1\* 11/2004 Weller .................. H04L 63/102
713/166
2008/0209211 A1 8/2008 Grgic et al.
(Continued)

FOREIGN PATENT DOCUMENTS

EP    2 279 465 A1   4/2014
WO    2009128905 A1  10/2009

OTHER PUBLICATIONS

Citation pg from European Search Report, completion date Mar. 9, 2018 issued in priority EP appln No. 17 19 1881. (2 pgs).

*Primary Examiner* — Simon P Kanaan
(74) *Attorney, Agent, or Firm* — Steven J. Grossman; Grossman, Tucker, Perreault & Pfleger PLLC

(57) ABSTRACT

A security unit for an industrial control system comprises an interface adapted to communicate with a plurality of components of an industrial control system via a data network, a security assignor adapted to access a first component among the plurality of components via the interface, and further adapted to assign a first security level pertaining to the first component to the first component. The security assignor is further adapted to access a second component among the plurality of components via the interface, and to assign a second security level pertaining to the second component to the second component. The security assignor is adapted to assign the first security level and the second security level to the first component and the second component, respectively, in accordance with a system security level pertaining to the industrial control system.

9 Claims, 5 Drawing Sheets

(51) Int. Cl.
*G05B 13/02* (2006.01)
*G05B 19/042* (2006.01)

(52) U.S. Cl.
CPC ........ *G05B 19/4185* (2013.01); *H04L 63/105* (2013.01); *G05B 2219/24159* (2013.01); *G05B 2219/24167* (2013.01)

(56) References Cited

U.S. PATENT DOCUMENTS

| | | |
|---|---|---|
| 2011/0039237 A1 | 2/2011 | Skare |
| 2015/0018983 A1 | 1/2015 | Grgic et al. |
| 2015/0082406 A1* | 3/2015 | Park .................... H04L 63/0815 |
| | | 726/9 |
| 2018/0189797 A1* | 7/2018 | Ravi .................. G06Q 10/0635 |

* cited by examiner

SECURITY UNIT AND METHOD FOR AN INDUSTRIAL CONTROL SYSTEM

FIELD OF THE INVENTION

The disclosure relates to industrial control systems and factory automatization, and more particularly to a security unit for managing security settings and security applications of an industrial control system.

BACKGROUND

Industrial control systems are systems for controlling devices or machinery by means of control programs. Control systems may comprise a large number of components interconnected via a network, such as a factory network or the internet. These components may be provided by different sources, may be off-the-shelf components or tailor made, may have been modified to accommodate specific requirements of the factory environment in which they are used, and may be of different generations. It is a particular challenge to safeguard such a heterogeneous, modular control system against cyber threats, such as unauthorized access, computer viruses and worms. Evaluating a security level of such a modular and heterogeneous control system is another challenge.

These challenges are particularly pronounced in state-of-the-art control systems that provide online access to at least some of its components from the outside, such as for remote control, management and maintenance. Conventionally, such control systems have been secured by firewalls enabling a package filtering, and additional firewalls may be provided for sensitive components within the control system. Established technical standards such as OPC UA allow non-encrypted as well as encrypted communication over a single port, but do not allow to provide a reliable estimate of the security levels of components behind the port. Hence, there is so far no systematic way to determine a security level of the entire system. Moreover, conventionally each component or firewall needs to be configured individually to establish the security. This is not only time consuming and error-prone, but may also overburden users that lack the necessary background in cyber security.

What is needed is a convenient and safe system and method to allow a user to determine the security level of an industrial control system, and an easy way of setting a security level of individual components of the industrial control system.

OVERVIEW OF THE INVENTION

This objective is achieved with a security unit for an industrial control system according to claim 1, a component for an industrial control system according to claim 5, a method for operating a component of an industrial control system according to claim 8, and a method for operating an industrial control system according to claim 9. The dependent claims relate to preferred embodiments.

A security unit for an industrial control system according to the invention comprises an interface adapted to communicate with a plurality of components of an industrial control system via a data network, a security assignor adapted to access a first component among said plurality of components via said interface, and further adapted to assign to said first component a first security level pertaining to said first component. Said security assignor is further adapted to access a second component among said plurality of components via said interface, and to assign to said second component a second security level pertaining to said second component. Said security assignor is adapted to assign said first security level and said second security level to said first component and said second component, respectively, in accordance with a system security level pertaining to said industrial control system.

The invention hence provides a security unit that may allow to centrally assign security levels to components of an industrial control system. This can significantly facilitate the control and management of the security settings of the industrial control system, in particular for large, modular, homogeneous industrial control systems.

By assigning said first security level to said first component, said security assignor may cause said first component to adjust an operational setting of said first component in accordance with said first security level.

Similarly, by assigning a second security level to said second component, said security assignor may cause said second component to adjust an operational setting of said second component in accordance with said second security level.

In particular, said second component may be different from said first component.

Said second security level may be different from said first security level, in accordance with different security requirements of said first and second components. However, in other embodiments, said second security level may be equal to said first security level, and may in particular be equal to said system security level.

In general, said industrial control system may comprise any (potentially large) number of components, and said security assignor may be adapted to assign individual security levels to said respective components in the same way as described above for the first and second component.

In an embodiment, said security unit further comprises a security requestor adapted to access a third component among said plurality of components via said interface, and adapted to request information pertaining to a third security level of said third component from said third component.

The security requestor according to the embodiment allows the security unit to query a security level pertaining to said third component. This information may be used to determine or derive a security level of the entire industrial control system, in particular when combined with corresponding information from other components.

Said third component may be identical to one of said first or second components, or may be different from said first and second components.

In an example, said security unit may be further adapted to compare said information pertaining to said third security level with said system security level.

In an example, said security assignor may be further adapted to reassign a revised third security level to said third component, in particular in accordance with said system security level.

As an example, a comparison of said information pertaining to said third security level may reveal that said third security level that is currently being implemented at said third component is lower than required to establish an overall system security as prescribed by said system security level. Said security assignor may hence reassign a revised (increased) third security level to said third component.

In an embodiment, said security unit further comprises a database holding a first entry pertaining to said first component and said first security level, and/or further holding a second entry pertaining to said second component and said second security level, and/or further holding a third entry pertaining to said third component and said third security level.

Said database may provide a user of the system with a view of the security settings of said components of said industrial control system.

In particular, said security unit may be adapted to output, such as via a user interface, information pertaining to security settings of one or a plurality of components of said industrial control system.

Said information provided to said user may further comprise information pertaining to required steps or actions that the user may need to take in order to attain the desired security level at one or a plurality of said components of said industrial control system.

For instance, such an information may comprise instructions for setting passwords or generating software certificates for a component of said industrial control system.

In an embodiment, said security unit may be further adapted to generate and/or provide a protocol pertaining to changes of settings at a component or a plurality of components that may affect a security level, such as a security level pertaining to a component and/or said system security level. These changes may be provided with a time stamp.

Said security unit may be adapted to store said protocol in said database.

Said security unit may be further adapted to output said protocol upon request of a user such as via said user interface.

This may provide the user with a convenient and easy-to-use overview of the security settings of said industrial control system, comprising said security levels attained at said components and/or further comprising said system security level.

In an embodiment, said security unit further comprises a user interface adapted to receive information pertaining to said first security level and/or said second security level and/or said third security level and/or said system security level from a user.

Hence, a user may employ said user interface to prescribe the security levels of the entire industrial control system, or some or all of its components.

Said components, in the sense of the present disclosure, may be any portion, device or system of an industrial control system, and can be realized in hardware, software or firmware.

For instance, said first component and/or said second component and/or said third component may comprise an industrial controller unit and/or a programming environment for an industrial controller unit and/or a compiler unit adapted to compile industrial control programs and/or a network communication element of said industrial control system and/or a firewall of said industrial control system and/or a library of said industrial control system and/or a user management unit of said industrial control system.

Said component may also be a software component or a firmware component, such as a plugin component or an application component.

Said first component and/or said second component and/or said third component may be implemented in software, or implemented in hardware, or partly implemented in hardware and partly implemented in software.

In an embodiment, said first component and/or said second component and/or said third component may be a software and/or firmware component relating to an industrial control program, such as part of an industrial control program, a plugin component for an industrial control program, or an application component for an industrial control program.

Some portions or parts of an industrial control system may also be combined into a component, and a common security level may be assigned to said (combined) component.

In the sense of the present disclosure, said first security level and/or said second security level and/or said third security level may pertain to a level of resilience or security of said respective first, second, and third components against an attack, such as a cyberattack, and/or a malfunction.

Correspondingly, said system security level may pertain to a level of resilience security of the entire industrial control system comprising said plurality of components against an attack, such as a cyberattack, and/or a malfunction.

In some embodiments, said security unit and/or said interface may be implemented in hardware. In other embodiments, said security unit and/or said interface may be implemented in software, and hence may refer to a software program or app running on a computer that is part of said industrial control system, or coupled to said industrial control system. In these embodiments, said interface adapted to communicate with a plurality of components of an industrial control system may refer to a software interface, and said security assignor may refer to a software functionality.

In still other embodiments, said security unit and/or said interface may be partly implemented in hardware and partly implemented in software.

Said security assignor may access said first component and said second component via any network functionality or communication link. In particular, said security assignor may be adapted to access said first component and/or said second component by means of a firmware, such as by means of an industrial control program, and/or by means of a data file and/or by means of a configuration file. Said security assignor may be adapted to access said first component and/or said second component by means of an online access, in particular via the Internet.

In an embodiment, said security assignor is adapted to receive a message from said first component indicating that said first security level has been adopted by said first component.

Said message may alternatively indicate that said first security level cannot be adopted by said first component, such as in situations in which said first component does not provide for or does not allow to set a security setting according to said first security level. Said security unit may then try to set a different security level at said first component, and/or may notify a user that said first security level could not be set at said first component.

Correspondingly, said security assignor may be adapted to receive a message from said second component indicating that said second security level has been adopted by said second component, or cannot be adopted by said second component.

The invention further relates to a component for an industrial control system, wherein said component is adapted to receive a security level pertaining to said component from a security unit, such as from a security unit with some or all of the features described above.

Said component may be adapted to store said security level.

In an embodiment, said component may be adapted to compare an operational setting of said component with said security level received from said security unit.

In an embodiment, said component may be adapted to adjust an operational setting of said component in accordance with said security level.

Said component may allow to choose among a plurality of operational settings corresponding to different security levels. Said component may adopt one operational setting among a choice or plurality of operational settings in accordance with said security level received from said security unit.

In an embodiment, said component may be adapted to confirm to said security unit that it has adopted an operational setting in accordance with said security level, or alternatively that it is unable to adopt an operational setting in accordance with said security level.

In an embodiment, said component may be adapted to output information pertaining to said security level, such as via an interface to a user.

For instance, said component may provide a user with information specifying the security requirements that the user may need to meet in order to attain the prescribed security level. For instance, said component may inform a user about requirements for a password to be selected by said user.

The invention further relates to an industrial control system comprising a plurality of components connected via a data network, wherein said industrial control system comprises a security unit with some or all of the features described above.

In an example, said plurality of components comprises at least a first component and at least a second component with some or all of the features described above.

In particular, said first component and/or said second component may be adapted to store said respective first and second security level.

Said first component may be adapted to compare an operational setting of said first component with said first security level received from said security unit.

Similarly, said second component may be adapted to compare an operational setting of said second component with said second security level received from said security unit.

Said first component may be adapted to adjust an operational setting of said first component in accordance with said first security level.

Similarly, said second component may be adapted to adjust an operational setting of said second component in accordance with said second security level.

Said first component and/or said second component may allow to choose among a plurality of operational settings corresponding to different security levels.

Said first component may be adapted to confirm to said security unit that is has adopted an operational setting in accordance with said first security level, or that it is unable to adopt an operational setting in accordance with said first security level.

Similarly, said second component may be adapted to confirm to said security unit that is has adopted an operational setting in accordance with said second security level, or that it is unable to adopt an operational setting in accordance with said second security level.

The invention further relates to a method for operating a component of an industrial control system, comprising receiving a security level pertaining to said component from a security unit.

Said method may further comprise storing said security level in said component.

In an embodiment, said method further comprises comparing an operational setting of said component with said security level received from said security unit.

In an embodiment, said method comprises adjusting an operational setting of said component in accordance with said security level received from said security unit.

Said method for operating said component may further comprise outputting information pertaining to a security level pertaining to said component, such as to a user via a database.

Said information may comprise said security level. Said information may alternatively or additionally comprise auxiliary information pertaining to said security level, such as instructions for a user of how to attain said security level, for instance instructions for selecting a password.

The invention further relates to a method for operating an industrial control system comprising a plurality of components connected via a data network, comprising accessing a first component among said plurality of components, and assigning to said first component a first security level pertaining to said first component; and accessing a second component among said plurality of components, and assigning to said second component a second security level pertaining to said second component. Said first security level and said second security level are assigned in accordance with a system security level pertaining to said industrial control system.

In an embodiment, the method further comprises accessing a third component among said plurality of components, and requesting information pertaining to a third security level of said third component from said third component.

In an embodiment, the method further comprises comparing said information pertaining to said third security level with said system security level.

Said method may further comprise reassigning a revised third security level to said third component, in particular in accordance with said system security level.

In an embodiment, the method further comprises storing a first entry pertaining to said first component and said first security level, and/or storing a second entry pertaining to said second component and said second security level, and/or storing a third entry pertaining to said third component and said third security level, in particular in a database.

In an embodiment, the method further comprises the step of receiving said first security level and/or said second security level and/or said third security level and/or said system security level from a user, in particular via a user interface.

According to an embodiment, the method for operating said industrial control system may further comprise providing information pertaining to said first security level and/or said second security level and/or said system security level, such as to a user via a user interface.

According to an embodiment, the method further comprises a step of providing a protocol pertaining to changes of said first security level and/or said second security level and/or said system security level over time.

Said protocol may be provided to said user via said interface.

Said method may further comprise receiving a message from said first component indicating that said first security level has been adopted by said first component, or cannot be adopted by said first component.

Similarly, said method may comprise receiving a message from said second component indicating that said second security level has been adopted by said second component, or cannot be adopted by said second component.

In an example, the method further comprises storing said first security level in said first component, and/or storing said second security level in said second component.

In an embodiment, the method further comprises comparing an operational setting of said first component with said first security level, and/or comparing an operational setting of said second component with said second security level.

The method may further comprise a step of adjusting an operational setting of said first component in accordance with said first security level, and/or adjusting an operational setting of said second component in accordance with said second security level.

The invention further relates to a computer software program or to a computer software program product comprising computer-readable instructions, such that said instructions, when read on a computer, cause said computer to perform a method with some or all of the steps described above.

BRIEF DESCRIPTION OF THE FIGURES

The features and numerous advantages of the systems and methods according to the present invention will be best understood from a description of exemplary embodiments with reference to the accompanying drawings, in which.

DESCRIPTION OF EMBODIMENTS

Embodiments of the invention will now be described with reference to a security unit for an industrial control system, such as a manufacturing environment or production hall of an industrial fabrication process. However, the invention is not so limited, and may be employed in any environment in which programable logical controllers (PLC) are employed to control, operate, or monitor a plurality of devices. In the context of the present disclosure, these environments are generally referred to as industrial control systems.

Figure 1:
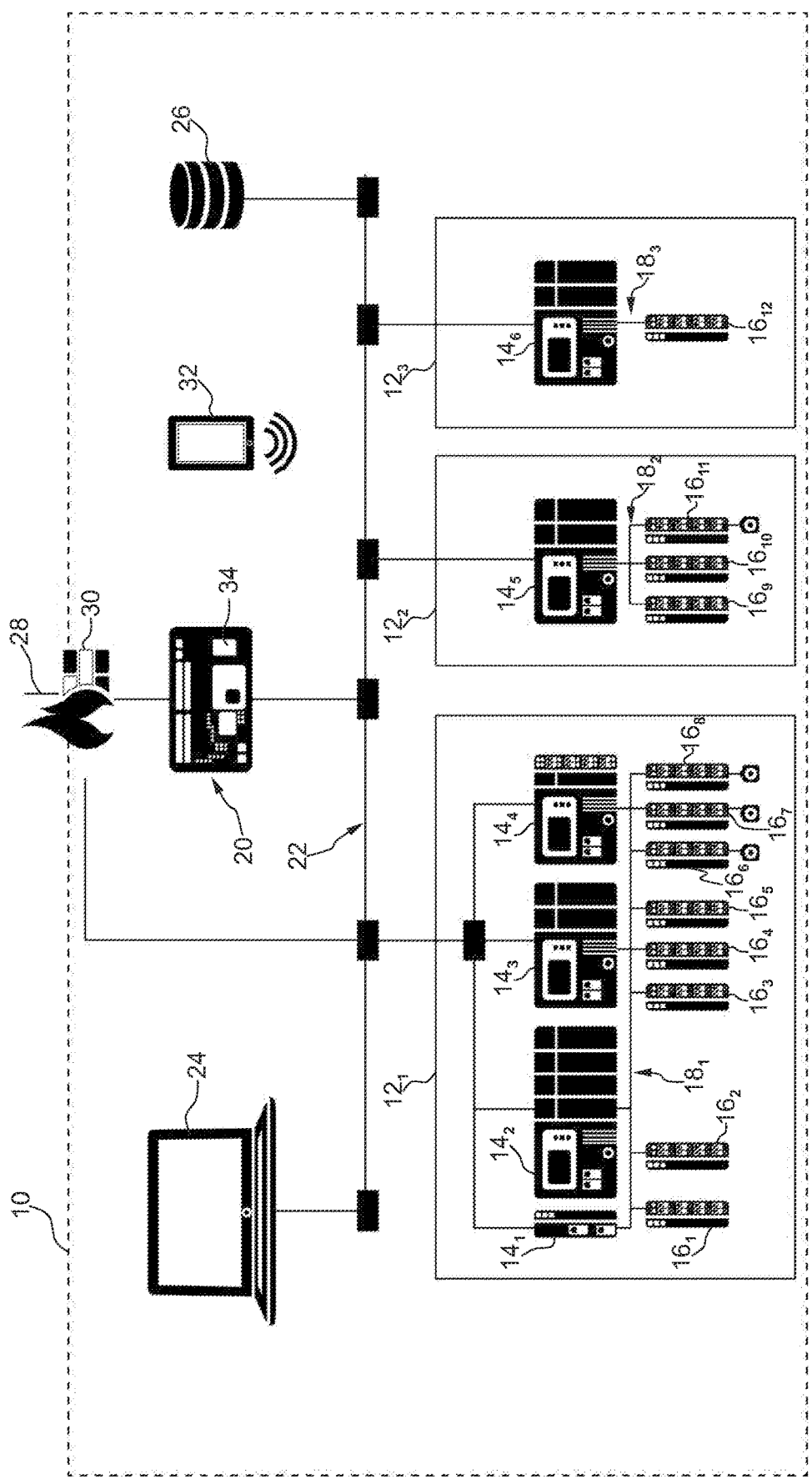
FIG. 1 is a schematic overview of an industrial control system in which the present invention can be employed.

FIG. 1 is a schematic overview of an industrial control system 10 in which a security unit and method for operating an industrial control system according to the present invention may be employed. The industrial control system 10 may correspond to the production hall of an industrial fabrication process and may comprise a plurality of different machines $12_1$, $12_2$, $12_3$, which may be different machines of the industrial fabrication process, such as machines for manufacturing a workpiece, modifying a workpiece, or painting a workpiece in a factory environment. FIG. 1 shows a configuration with three machines $12_1$, $12_2$, $12_3$. However, this is for simplicity only, and in general an industrial control system may comprise an arbitrary number of different machines.

As can be further taken from FIG. 1, each of the machines $12_1$, $12_2$, $12_3$ comprises at least one and in general a plurality of industrial controller components $14_1$, ..., $14_6$, which may each comprise a programmable logical controller (PLC) and may be adapted to access and/or control one or a plurality of machine components $16_1$, ..., $16_{12}$. For instance, the machine $12_1$ may comprise four industrial controller components $14_1$, ..., $14_4$, which are connected via a machine network $18_1$ with eight machine components $16_1$, ..., $16_8$. Each of the machine components $16_1$, ..., $16_8$ may control a specific functionality or component or process of the machine $12_1$. The industrial controller components $14_1$, ..., $14_4$ may each run an industrial control program, such as in the form of a firmware or software, which accesses the machine components $16_1$, ..., $16_8$ via the machine network $18_1$ provides instructions for operating the machine $12_1$ to the machine components $16_1$, ..., $16_8$ and/or receives control feedback or measurement values back from the machine components $16_1$, ..., $16_8$.

Similarly, the machine $12_2$ comprises an industrial controller component $14_5$ which is connected via the machine network $18_2$ with three machine components $16_9$, $16_{10}$, $16_{11}$ that each control a particular functionality of the machine $12_2$.

The machine $12_3$ is configured similarly to machines $12_1$ and $12_2$, but comprises a single industrial controller component $14_6$ controlling a single industrial controller component $16_{12}$, via the machine network $18_3$.

As can be further taken from FIG. 1, the industrial control system 10 further comprises a central control component 20 which is connected via an industrial control network 22 to each of the machines $12_1$, $12_2$, $12_3$. The central control component 20 may be employed to manage and/or administer the industrial control system 10 on site. For instance, the central control component 20 may provide parameters and/or instructions to the individual industrial controller components $14_1$, ..., $14_6$, such as configuration information or parameter values, and may receive and display measurement values received from the industrial controller components $14_1$, ..., $14_6$.

The industrial control system 10 further comprises an engineering component 24 connected via the industrial control network 22 to the machines $12_1$, $12_2$, $12_3$ and central control component 20. The engineering component 24 may comprise a programming environment which allows to edit, compile and provide industrial control programs in the form of software and/or firmware to each of the industrial controller components $14_1$, ..., $14_6$.

Program files, configuration files, and/or data files comprising parameters for the industrial control programs of the industrial control system 10 may be stored centrally in an automation server component 26, and may be provided to the engineering component 24 and industrial controller components $14_1$, ..., $14_6$ via the industrial control network 22.

As can be further taken from FIG. 1, the industrial control system 10 may be connected to an external network 28, such as the Internet, so as to allow the industrial control system 10, central control component 20, the engineering component 24 and/or the automation server component 26 to establish a data communication link with external resources and databases. An interface to the external network 28 may be secured by means of a firewall component 30 of the industrial control system 10, so as to monitor the data traffic to and from the external network 28 and to provide security against cyber attacks. In some embodiments, the central control component 20, engineering component 24, and/or other components of the industrial control system 10 may be equipped with additional firewall components (not shown) to further enhance the network security.

As can be further taken from FIG. 1, the industrial control system 10 may additionally comprise a remote access component 32 allowing wireless access to the central control component 20, industrial controller components $14_1, \ldots, 14_6$ and/or additional components of the industrial control system. For instance, the remote access component 32 may allow a user to access components of the industrial control system 10 wirelessly from his mobile device, so as to monitor the industrial control system 10 and/or change a setting of parameters of the industrial control system 10.

A modular industrial control system 10 such as shown in FIG. 1 may comprise components from different manufacturers, sources and generations. Each of its components, such as the industrial controller components $14_1, \ldots, 14_6$, can provide a plurality of user functionalities, but in a given production environment not all of these functionalities are always needed or used. For instance, each of the industrial controller components $14_1, \ldots, 14_6$ may be provided with a web server, which may or may not be required and used in a given production environment. Some manufacturers of the industrial controller components $14_1, \ldots, 14_6$ provide network security equipment, such as software certificates, while others do not.

The user of the industrial control system 10 oftentimes has a large degree of flexibility when configuring the system, which increases the overall complexity of the system 10. For instance, the user may use software components and hardware components from a plurality of sources, may add on libraries or applications for the industrial controller components $14_1, \ldots, 14_6$, or may have different requirements and techniques for establishing an external access to the industrial control system 10, or even each of its components, such as the industrial controller components $14_1, \ldots, 14_6$.

Protecting such a modular and heterogeneous industrial control system 10 effectively and efficiently against cyberattacks is a challenging task, the more so if the user requires an online access to the industrial control system 10 from the outside, such as via the Internet.

Different technical standards, such as IEC62443, define certain security levels, which correspond to levels of resilience against cyberattacks, as well as tasks or requirements required to guarantee these security levels. However, even if such security levels are assigned to some or all of the components of the industrial control system 10, it remains a challenge to assess the security level of the overall system, and/or to change the security settings of the industrial control system 10. In conventional systems, monitoring the security level or changing the security level may require the user to access each of the numerous components of the industrial control system 10 individually, which may overwhelm a user that lacks the necessary cyber security background. Moreover, a change of settings of the security parameters at one component may have implications on the security level of other components, and hence the entire industrial control system 10. Conventional systems may lack the possibility of identifying these cross-connections, which may compromise the cyber security of the entire industrial control system 10.

The techniques according to some embodiments of the present invention address these security challenges and concerns by assigning unified security levels to some or all components of the industrial control system 10, and managing them centrally by means of a security unit 34. For instance, the security unit 34 may be a software and/or hardware unit located in the central control component 20 of the industrial control system 10. In other embodiments, the security unit may be implemented as part of the automation server component 26, or other components of the industrial control system 10.

The security unit 34 may access the components of the industrial control system 10 via a software and/or hardware interface (not shown in FIG. 1) the industrial control network 22, may query security parameters relating to the security levels from these components, and/or may set security levels at the respective components in accordance with the system security level pertaining to a security required for the industrial control system 10. Any component of the industrial control system 10 may be assigned a security level, and may be accessed by the security unit 34 as described above. This may include the industrial controller components $14_1, \ldots, 14_6$, some or all of the machine components $16_1, \ldots, 16_{12}$, the engineering component 24, the automation server component 26, the central control component 20, as well as the firewall component 30.

Figure 2:
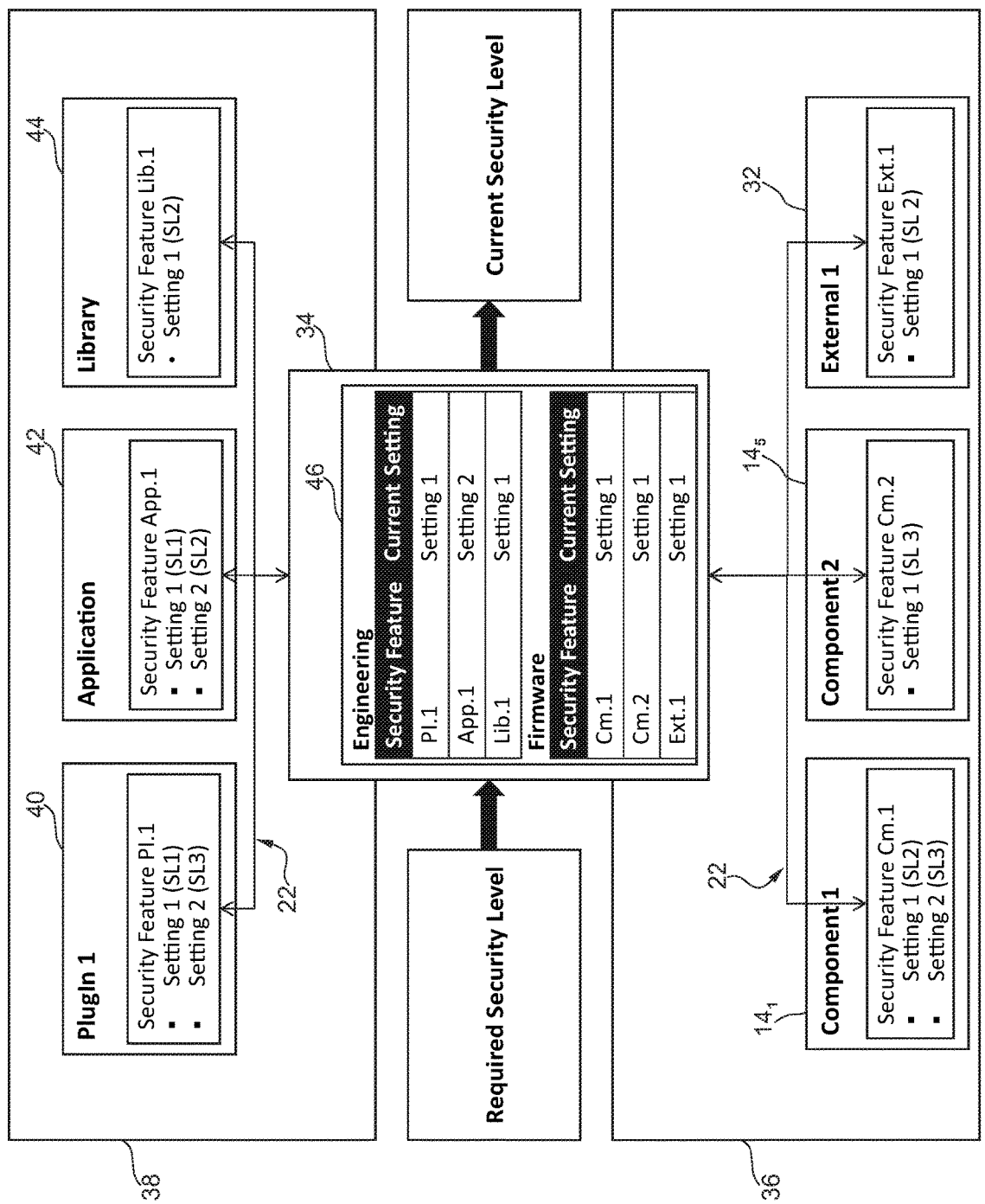
FIG. 2 illustrates the interaction of a security unit according to an embodiment of the invention with the engineering tools and PLC firmware of an industrial control system.

FIG. 2 is a schematic diagram that illustrates the interaction between the security unit 34 and the components of both a firmware level 36 and an engineering level 38 of the industrial control system 10 according to an embodiment.

For instance, the firmware level 36 may comprise components of the machines $12_1, 12_2, 12_3$, such as industrial components $14_1$, and $14_5$, as well as the remote access component 32. Each of the components $14_1, 14_5, 32$, may be able to operate according to one or a plurality of security levels (SL). The security levels may be security levels attributed to these component in accordance with a technical standard such as IEC62443, which distinguishes between five different security levels SL0, . . . , SL4 in order of increasing security, or any other system of security levels. The security levels SL may indicate or pertain to a level of resilience against a cyberattack.

For instance, the security levels of the components $14_1$ and $14_5$ may refer to the security of an OPC UA, which has a possibility of communicating unencrypted (corresponding to security level SL1), with signature (SL2), or encrypted and with signature (SL3).

In the specific example of FIG. 2, the first component $14_1$ may be adapted to switch between two different operational or parameter settings corresponding to two different security levels SL2 and SL3. In contrast, the second component $14_5$ may be set to operate according to a fixed security level SL3, and the remote access component 32 according to a fixed security level SL2.

Other components to which security levels according to the present invention may be assigned include software components of the industrial control software or firmware, such as plugins, applications, and libraries.

Similarly, security levels may be assigned to components of the engineering level 38, such as tools of the engineering component 24. These may include any components that may be employed in the design, programming, and/or editing of industrial control software or firmware, such as a plugin component 40, an application component 42, or a library component 44.

For instance, the plugin component 40 may correspond to a plugin for user access management. A security setting SL1 may correspond to a configuration for which a user name and a password are required, whereas a security level SL2 may correspond to a user name and a password according to certain password specifications (such as more than 8 characters, comprising both numbers and special characters). A security level SL3 may correspond to a two-way authentication by means of password and certificate. Once a user tries to access the system by means of the plug-in component 40, the plugin component 40 may require user identification in accordance with the adopted security level.

The application component 42 may operate unprotected (corresponding to security level SL1), with certificate signature (SL2), or with certificate signature and encrypted by means of a password (SL3).

The library component 44 may correspond to an IEC61131-3 library for HTTP/HTTPS communication and may be adapted to communicate both via HTTP and HTTPS (corresponding to security level SL1), or HTTPS only (security level SL2).

In the specific example of FIG. 2, the plugin component 40 may allow to choose between two different security settings, pertaining to security levels SL1 and SL3, wherein the application component 42 may allow to select between security settings according to levels SL1 or SL2. In contrast, the library component 44 may operate according to a fixed security level SL2 only.

The security unit 34 is connected to the firmware level 36 and to the engineering level 38 via the industrial control network 22 and allows to access the individual components 14$_1$, 14$_5$, 32, 40, 42, 44 and query their respective security level settings. As further shown in FIG. 2, the security unit 34 may hold the current settings in the database 46 which lists the respective components and the associated security settings.

The security unit 34 may be further adapted to compare the current settings stored in the database 46 with a required security level, such as an overall system security level which the user prescribes for the cyber security of the industrial control system 10. For instance, the user may prescribe a minimum system security level SL2 for the industrial control system 10, which may entail that each of the components should attain at least the security level SL2. The security unit 34 may then compare the security level stored for the respective components in its database 46 with the system security level. The comparison may show that all the components 14$_1$, 14$_5$, 32, 42, 44 satisfy the system security level SL2, whereas the plugin component 40 is currently set to the lower security level SL1 only. The security unit 34 may hence access the plugin component 40 of the engineering component 24 via the industrial control network 22, and may trigger the plugin component 40 to switch to setting 2, which pertains to a security level SL3 higher than the minimum security level SL2. The plugin component 40 may confirm to the security unit 34 that it has adopted the new setting 2 corresponding to security level SL3.

In some embodiments, a given or required system security level may not be attainable by all components. For instance, if the user prescribes a minimum security level SL3, only the plugin component 40, industrial controller component 14$_1$, and industrial controller component 14$_5$ can switch to a corresponding setting, whereas the remote access component 32, application component 42 and library component 44 can operate only up to security level SL2, and hence are unable to switch to a setting that would correspond to security level SL3. In this example, the external component 32, application component 42 and library component 44 may report to the security unit 34 that they are unable to adopt a security level SL3. The security unit 34 may hence inform the user that a system security level SL3 may not be attainable. In some examples, the user may be able to add an exception for some components. For instance, field busses may not offer sophisticated security options, but are often physically separated from other networks, and hence may be considered non-critical for the overall system integrity. Hence, a corresponding exception may be set and registered for field bus components.

Based on the current settings stored in the database 46, the security unit 34 may also be adapted to determine an overall security level pertaining to the entire industrial control system 10. In some examples, the current overall security level may correspond to the minimum security level SL currently attained by its components. For instance, in the configuration of FIG. 2, the minimum security level is SL1 at the plugin application 4o, and hence the overall current security level is SL1. The security unit 34 may output the current security level to the user upon a request. The output for the user may also comprise a protocol comprising a list of active components in the industrial control system 10, and their current security level. Based on this information, the user may decide whether to increase the overall system security level to SL2, which would require the security level of the plugin component 40 to be increased to SL3, as described above.

Figure 3:
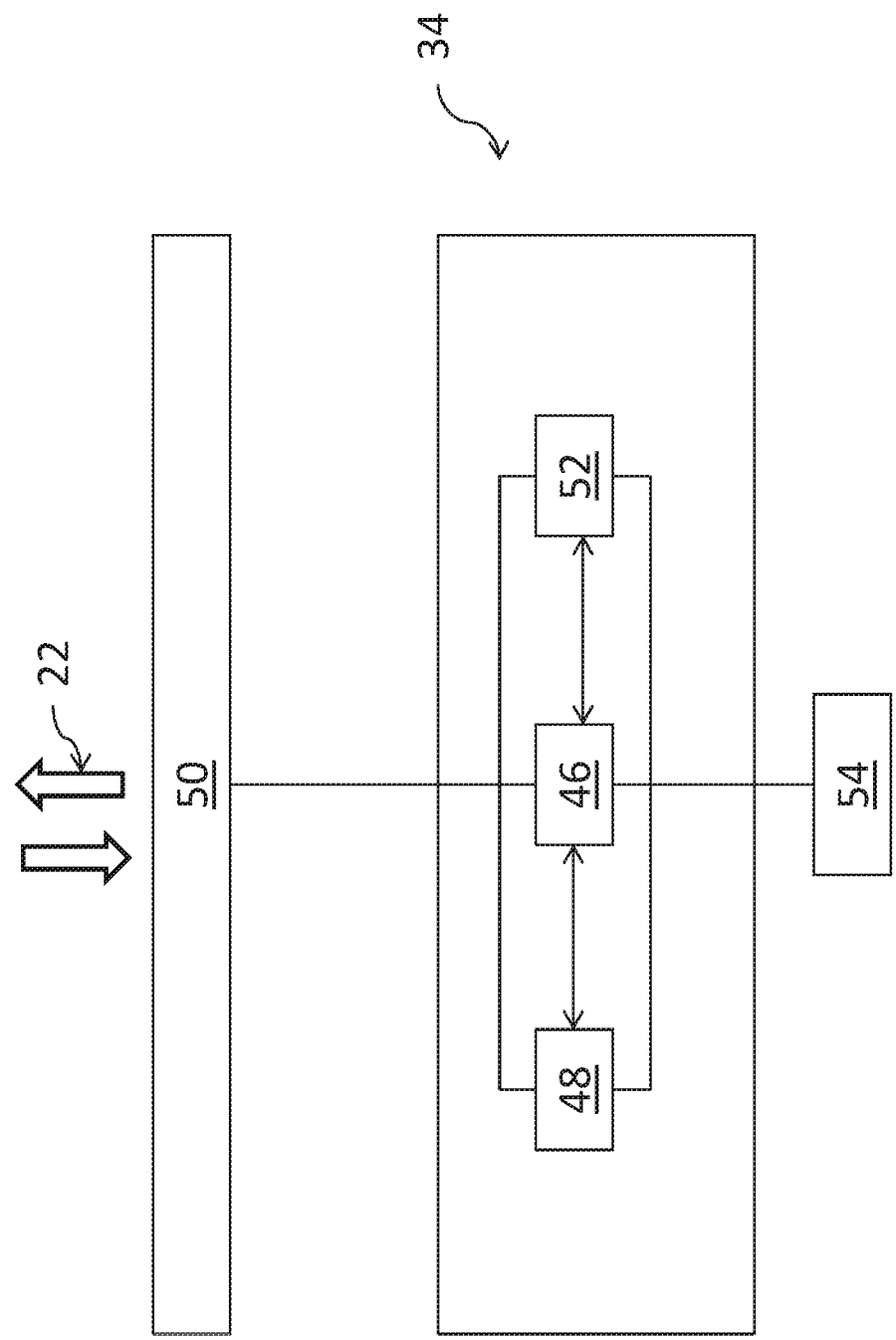
FIG. 3 is a conceptional diagram shoring a security unit according to an embodiment.

FIG. 3 is a conceptional diagram illustrating a security unit 34 as described above with reference to FIGS. 1 and 2 in additional detail.

The security unit 34 comprises a security assignor 48, which may be adapted to communicate with the database 46 and may be adapted to communicate via an interface 50 that is coupled to the industrial control network 22 with a plurality of components of the industrial control system 10, as described above with reference to FIGS. 1 and 2, such as the industrial controller components 14$_1$, 14$_5$, the remote access component 32, the plugin component 40, the application component 42, and/or the library component 44. The security assignor 48 may be realized as a hardware circuit, but may also be realized in software or firmware on a general data processing device, and may adapted to assign security levels to the respective components, as described above with reference to FIGS. 1 and 2.

The security unit 34 may optionally further comprise a security requestor 52 coupled to the database 46 and the security assignor 48. The security requestor 52 may be adapted to access components of the industrial control system 10 via the interface 50 and industrial control network 22, and may be adapted to request information pertaining to a security level of said respective components from said components, as described above with reference to FIGS. 1 and 2. Similarly to the security assignor 48, the security requestor 52 may be implemented as a hardware circuit or as a software or firmware on a general data processing device. In some embodiments, the security assignor 48 and the security requestor 52 may be implemented on a common data proceeding device.

The interface 50 may be realized in hardware and/or software or firmware, or in a combination of hardware and software, and may be adapted to establish two-way communication between the security unit 34 and the industrial control network 22, in particular the components 14$_1$ to 14$_6$, 16$_1$ to 16$_{12}$, 20, 24, 26, 30, 32, 40, 42, 44 of the industrial control system 10.

As can be further taken from FIG. 3, the security unit 34 may optionally further comprise a user interface 54 adapted to receive information pertaining to the security levels from a user. The user interface 54 may also be adapted to output information pertaining to the security levels to the user. For instance, the security unit 34 may be adapted to provide the user via the user interface 54 with a list of all or a subset of active components within the industrial control system 10, and information pertaining to their attainable security levels and/or their current security level based on data stored in the database 46. The security unit 34 may also employ the user interface 54 to provide information as to how a user may attain a prescribed security level at a given component, such as information pertaining to a suitable choice of password. In addition, the security unit 34 may employ the user interface 54 to provide the user with a protocol containing events pertaining to a change of a security level over time of some or all of the components in the industrial control system 10.

For instance, the user interface 54 may be a wireless interface adapted to communicate with a user via a wireless network. In other embodiments, the user interface 54 may be integrated into the interface 50.

Figure 4:
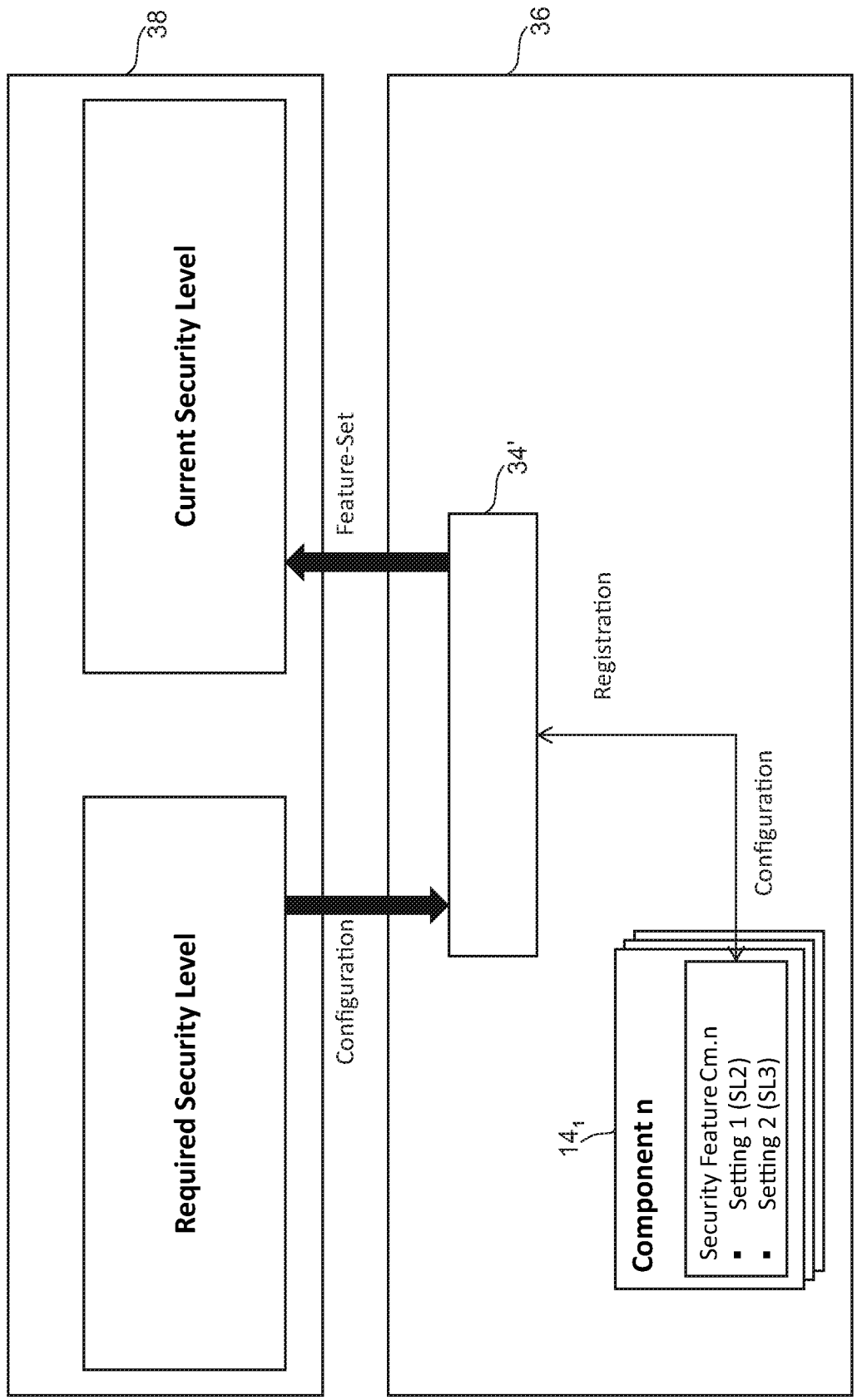
FIG. 4 is a schematic system view of a security unit employed on a firmware level according to an embodiment.

FIG. 4 is a schematic overview of the functionality of a security unit 34' according to an embodiment. The security unit 34' generally corresponds to the security unit 34 as described with reference to FIGS. 1 to 3 above, but may be implemented as a software unit in the firmware level 36 of the industrial control system 10.

The security unit 34' communicates with the engineering level 38 of the industrial control system 10 via the industrial control network 22. For instance, the security unit 34' may receive a message pertaining to a required security level from the engineering component 24 of the engineering level 38, and/or may provide information pertaining to a current security level to the engineering level 38.

As further shown in FIG. 3, the security unit 34' may communicate with firmware components of the industrial control system 10, such as an industrial controller component 14$_1$ relating to the machine 12$_1$ of the industrial control system 10. As described previously with reference to FIG. 2, the industrial controller component 14$_1$ may allow to choose between two operational settings, a Setting 1 corresponding to a security level SL2 and a Setting 2 corresponding to a security level SL3.

Once the industrial controller component 14$_1$ is started up, it may register with the security unit 34'. As part of the registration, it may provide its current security level, which may correspond to a default setting of the industrial controller component 14$_1$. For instance, if the default setting of the industrial controller component 14$_1$ is Setting 1, the industrial controller component 14$_1$ may report the security level SL2 during the startup phase. The security unit 34' may compare the security level reported by the industrial controller component 14$_1$ with the required security level, such as a system security level requested by a user. In case the security level reported by the industrial controller component 14$_1$ is no lower than the required security level, the component 14$_1$ may finalize its initialization and may start operating. If, however, the security level reported by the industrial controller component 14$_1$ is lower than the required security level, the security unit 34' may access the industrial controller component 14$_1$ and trigger the industrial controller component 14$_1$ to change its setting to Setting 2, corresponding to the higher security level SL3.

In some examples, the security unit 34' may provide instructions to adopt a prescribed security level to the industrial controller component 14$_1$ by means of a configuration file or data file. In other examples, the security unit 34' may provide instructions relating to a specific security setting as part of an industrial control software or firmware, such as an industrial control program provided by the engineering component 24.

Figure 5:
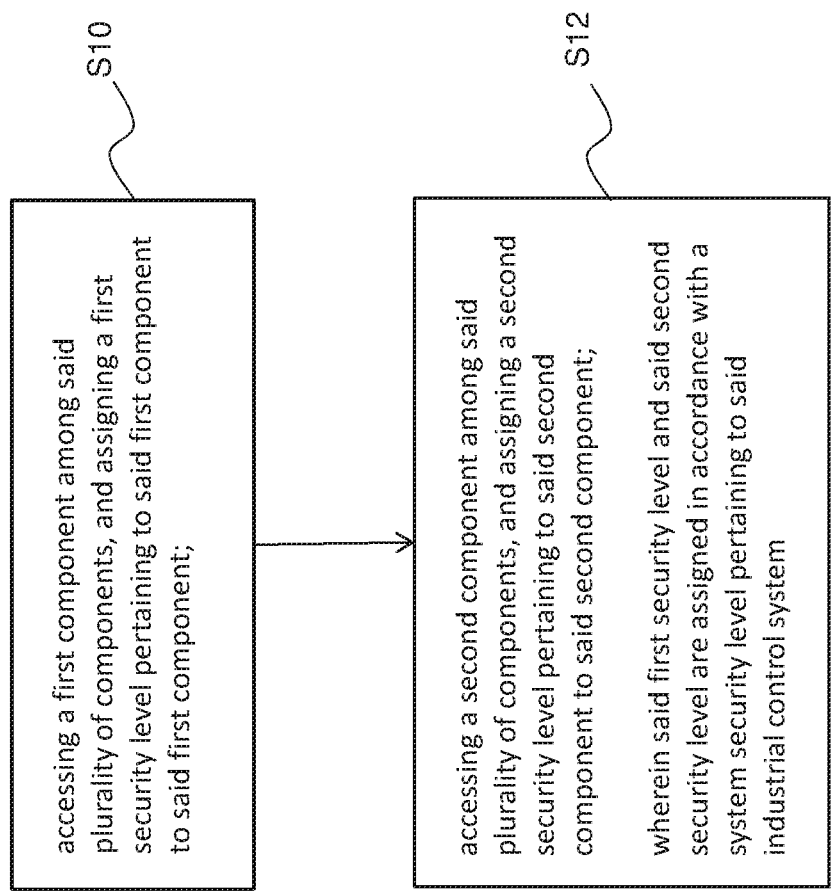
FIG. 5 is a flow diagram illustrating a method for operating an industrial control system according to an embodiment.

FIG. 5 is a flow diagram illustrating a method for operating an industrial control system according to an embodiment, such as the industrial control system 10 described above with reference to FIGS. 1 to 4. The industrial control system comprises a plurality of components connected via a data network.

In a first step S10, a first component among said plurality of components is accessed, and the first security level pertaining to said first component is assigned to said first component.

In a second step S12, a second component among said plurality of components is accessed, and a second security level pertaining to said second component is assigned to said second component, wherein said first security level and said second security level are assigned in accordance with a system security level pertaining to said industrial control system.

The descriptions of the examples and the Figures merely serve to illustrate the invention and the beneficial effects associated therewith, but should not be interpreted in a limiting sense. The scope of the invention is to be determined solely from the appended claims.

REFERENCE SIGNS

10 industrial control system
12$_1$, 12$_2$, 12$_3$ machines
14$_1$-14$_6$ industrial controller components
16$_1$-16$_{12}$ machine components
18$_1$, 18$_2$, 18$_3$ machine networks
20 central control component
22 industrial control network
24 engineering component
26 automation server component
28 external network
30 firewall component
32 remote access component
34, 34' security unit
36 firmware level of industrial control system 10
38 engineering level of industrial control system 10
40 plugin component
42 application component
44 library component
46 database of security unit
48 security assignor
50 interface
52 security requestor
54 user interface

What is claimed is:

1. A security unit for an industrial control system, comprising:
   an interface adapted to communicate with a plurality of components of an industrial control system via a data network;
   a security assignor adapted to access a first component among said plurality of components via said interface, and adapted to assign a first security level pertaining to said first component to said first component for storage of said first security level in said first component;
   said security assignor further adapted to access a second component among said plurality of components via said interface, and to assign a second security level pertaining to said second component to said second component for storage of said second security level in said second component, wherein said second component is different from said first component;
   wherein said security assignor is adapted to assign said first security level and said second security level to said first component and second component, respectively, in accordance with a system security level pertaining to said industrial control system;

wherein said second security level is equal to said first security level; and wherein said security assignor is adapted to receive a message from said first component indicating that said first security level has been adopted by said first component, or cannot be adopted by said first component; and/or wherein said security assignor is adapted to receive a message from said second component indicating that said second security level has been adopted by said second component, or cannot be adopted by said second component.

2. The security unit according to claim 1, further comprising a security requestor adapted to access a third component among said plurality of components via said interface, and adapted to request information pertaining to a third security level of said third component from said third component.

3. The security unit according to claim 2, further adapted to compare said information pertaining to said third security level with said system security level, and wherein said security assignor is further adapted to reassign a revised third security level to said third component in accordance with said system security level.

4. The security unit according to claim 1, further comprising a user interface adapted to receive said first security level and/or said second security level and/or said third security level and/or said system security level from a user.

5. An industrial control system comprising a plurality of components connected via a data network; said industrial control system comprising a security unit according to claim 1.

6. A method for operating an industrial control system comprising a plurality of components connected via a data network, comprising:

accessing a first component among said plurality of components, and assigning a first security level pertaining to said first component to said first component for storage of said first security level in said first component;

accessing a second component among said plurality of components, and assigning a second security level pertaining to said second component to said second component for storage of said second security level in said second component, wherein said second component is different from said first component;

wherein said first security level and said second security level are assigned in accordance with a system security level pertaining to said industrial control system;

wherein said second security level is equal to said first security level; and wherein said method further comprises:

receiving a message from said first component indicating that said first security level has been adopted by said first component, or cannot be adopted by said first component; and/or receiving a message from said second component indicating that said second security level has been adopted by said second component, or cannot be adopted by said second component.

7. The method according to claim 6, further comprising:

accessing a third component among said plurality of components, and requesting information pertaining to a third security level of said third component from said third component.

8. The method according to claim 6, further comprising:

comparing an operational setting of said first component with said first security level; and/or comparing an operational setting of said second component with said second security level.

9. A computer software program comprising computer-readable instructions, such that said instructions, when read on a computer, cause said computer to perform a method according to claim 6.

* * * * *